US012807049B2

(12) United States Patent
Choi et al.

(10) Patent No.: US 12,807,049 B2
(45) Date of Patent: Nov. 24, 2026

(54) WALK-IN DEVICE FOR VEHICLE SEAT

(71) Applicant: Hyundai Transys Inc., Seosan-si (KR)

(72) Inventors: Han Yun Choi, Hwaseong-si (KR); Hwa Young Mun, Hwaseong-si (KR); Gwon Hwa Bok, Hwaseong-si (KR); Seong Jun Shin, Hwaseong-si (KR); Cheolhwan Yoon, Hwaseong-si (KR); Junsik Hwang, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 271 days.

(21) Appl. No.: 18/820,615

(22) Filed: Aug. 30, 2024

(65) Prior Publication Data

US 2025/0091488 A1 Mar. 20, 2025

(30) Foreign Application Priority Data

Sep. 14, 2023 (KR) ........................ 10-2023-0122412

(51) Int. Cl.

| | |
|---|---|
| ***B60N 2/30*** | (2006.01) |
| ***B60N 2/10*** | (2006.01) |
| ***B60N 2/12*** | (2006.01) |
| ***B60N 2/235*** | (2006.01) |

(52) U.S. Cl.

CPC .............. *B60N 2/3011* (2013.01); *B60N 2/10* (2013.01); *B60N 2/12* (2013.01); *B60N 2/2352* (2013.01)

(58) Field of Classification Search

CPC .......... B60N 2/3011; B60N 2/10; B60N 2/12; B60N 2/0727; B60N 2/08; B60N 2/20; B60N 2/68; B60N 2/0818; B60N 2/06; B60N 2/085; B60N 2/0881; B60N 2/22; B60N 2/235; B60N 2/2352

USPC ................. 296/65.01, 65.11–65.18; 297/341

See application file for complete search history.

(56) References Cited

U.S. PATENT DOCUMENTS

| | | | | |
|---|---|---|---|---|
| 7,562,926 | B2 * | 7/2009 | Kojima | B60N 2/123 296/65.09 |
| 9,227,528 | B2 * | 1/2016 | Yamada | B60N 2/0705 |
| 2007/0278814 | A1 * | 12/2007 | Kojima | B60N 2/123 296/65.15 |
| 2022/0332222 | A1 * | 10/2022 | Hwang | B60N 2/943 |
| 2024/0336170 | A1 * | 10/2024 | Kim | B60N 2/06 |

FOREIGN PATENT DOCUMENTS

| | | | |
|---|---|---|---|
| KR | 10-2446336 | B1 | 9/2022 |
| KR | 10-2446337 | B1 | 9/2022 |
| KR | 10-2022-0143298 | A | 10/2022 |
| KR | 10-2023-0064716 | A | 5/2023 |

* cited by examiner

*Primary Examiner* — Amy R Weisberg
*Assistant Examiner* — Denise L. Esquivel
(74) *Attorney, Agent, or Firm* — Bridgeway IP Law Group, PLLC; Jihun Kim

(57) ABSTRACT

A walk-in device for a vehicle seat includes a rear link having one end connected to a seat cushion frame by a first hinge shaft, and the other end connected to an upper rail by a second hinge shaft, the rear link being capable of rotating in an unlocking direction about the second hinge shaft, and an unlocking device configured such that at least one bracket, which operates in conjunction with a rotational operation of the rear link, presses a locking pin in a state in which the bracket is elastically supported by an elastic member, such that an unlocked state is implemented.

9 Claims, 5 Drawing Sheets

WALK-IN DEVICE FOR VEHICLE SEAT

CROSS-REFERENCE TO RELATED APPLICATIONS

This application claims priority to and the benefit of Korean Patent Application No. 10-2023-0122412 filed in the Korean Intellectual Property Office on Sep. 14, 2023, the entire contents of which are incorporated herein by reference.

TECHNICAL FIELD

The present invention relates to a walk-in device for a vehicle seat.

BACKGROUND ART

In general, a walk-in device for a vehicle seat, which is capable of performing a walk-in function, may be mounted in a front seat of a recreational vehicle (RV) or a three-door vehicle to allow a rear seat passenger to get in or out of the vehicle.

The walk-in function refers to a function of folding a seatback of the front seat forward at a predetermined angle and simultaneously sliding the front seat forward by a predetermined distance when the rear seat passenger operates a walk-in switch of the front seat. A space may be ensured between the front seat and the rear seat by the walk-in function, and a passenger may get in or out of the vehicle through the ensured space.

In the case of the walk-in device for a vehicle seat in the related art, a rear link may be unrestrained when the passenger operates the walk-in switch. When the rear link is unrestrained, the rear link elastically supported by an elastic member may be rotated by an elastic restoring force of the elastic member. A locking pin may be pressed and unlocked by the operation of the rear link. Therefore, an upper rail may move along a lower rail.

However, in the case of the walk-in device for a vehicle seat in the related art, the locking pin is not completely unlocked by being pressed by a pressing bracket when the rear link operates. For this reason, the upper rail cannot smoothly move along the lower rail, or frictional noise is caused by friction between components.

DOCUMENTS OF RELATED ART

Patent Documents (Patent Document 1) Korean Patent No. 10-2446336 (published on Sep. 22, 2022)

(Patent Document 2) Korean Patent Application Laid-Open No. 10-2022-0143298 (published on Oct. 25, 2022)

SUMMARY OF THE INVENTION

The present invention has been made in an effort to solve the above-mentioned problem, and an object of the present invention is to provide a walk-in device for a vehicle seat, in which an unlocking device, which operates in conjunction with a rear link, presses a locking pin to implement a completely unlocked state.

In order to achieve the above-mentioned object, the present invention provides a walk-in device for a vehicle seat, the walk-in device including: a rear link having one end connected to a seat cushion frame by a first hinge shaft, and the other end connected to an upper rail by a second hinge shaft, the rear link being capable of rotating in an unlocking direction about the second hinge shaft; and an unlocking device configured such that at least one bracket, which operates in conjunction with a rotational operation of the rear link, presses a locking pin in a state in which the bracket is elastically supported by an elastic member, such that an unlocked state is implemented.

In addition, the unlocking device may include: a first bracket having one end rotatable in the unlocking direction by being pressed by the rear link, and the other end elastically supported by a first elastic member; a second bracket having one end connected to the other end of the first bracket, the second bracket being rotatable in the unlocking direction together with the first bracket; and a third bracket elastically supported by a second elastic member and configured to press the locking pin while rotating in the unlocking direction by being pressed by the second bracket.

In addition, a pressing part may be provided on the rear link, and one end of the first bracket may rotate in the unlocking direction by being pressed by the pressing part.

In addition, an upper end of the locking pin may penetrate an upper portion of the upper rail and be exposed, and when the upper end of the locking pin is pressed downward by the third bracket, a locking plate provided below the locking pin may depart from a locking groove of a lower rail, such that a locked state is released.

In addition, a maximally pressed state of the locking pin may be implemented by the third bracket, which operates in conjunction with the rear link when the rear link stands uprightly, such that the locking plate completely departs from the locking groove of the lower rail.

In addition, the first bracket and the first elastic member may be coupled to a third hinge shaft connected to the upper rail.

In addition, an external contact groove may be provided at one end of the third bracket, the external contact groove may be assembled to be externally in contact with an outer-diameter portion of a fourth hinge shaft connected to the upper rail, and the second elastic member may be coupled to the fourth hinge shaft.

In addition, a gear portion may be provided on an outer-diameter portion of one end of the rear link, a restrained state of the rear link may be implemented when a restraining gear of a restraining device engages with the gear portion, and the gear portion and the restraining gear may be disengaged when the restraining device performs a release operation, such that the rear link is rotated about the second hinge shaft in the unlocking direction by a rotation device that elastically supports the rear link.

In addition, a front link may be provided at an interval from the rear link, one end of the front link may be connected to the seat cushion frame, and the other end of the front link may be connected to the upper rail.

In addition, a portion of the locking pin, which is positioned in the upper rail, may be elastically supported by a fourth elastic member, the fourth elastic member may be compressed when the locking pin moves downward, and the fourth elastic member may be stretched and return the locking pin to an original position when a pressing force of the third bracket is eliminated from the locking pin.

According to the present invention, the unlocking device, which operates in conjunction with the rear link, presses the locking pin to implement the completely unlocked state.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
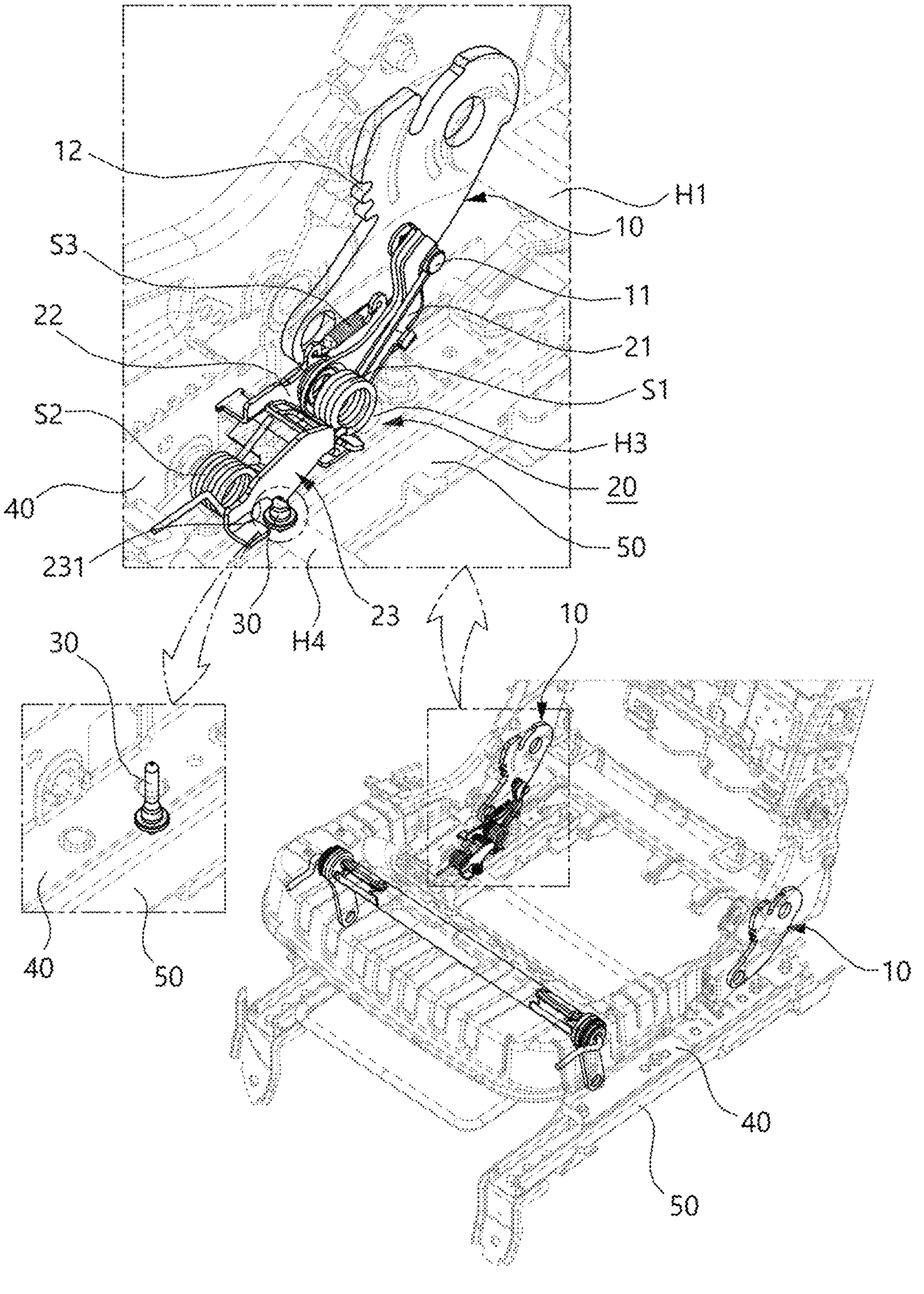
FIG. 1 is a perspective view of a walk-in device for a vehicle seat according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
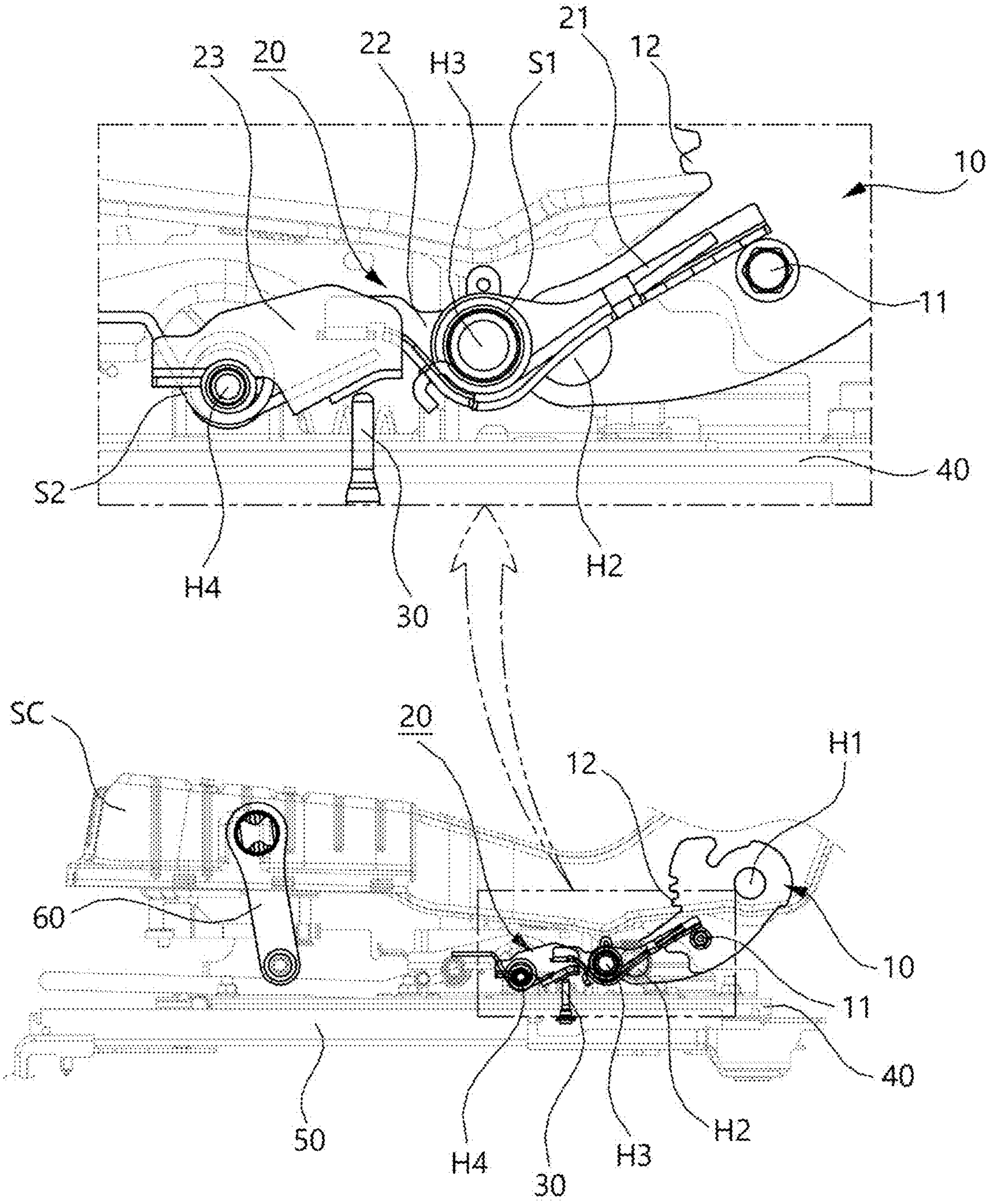
FIG. 2 is a view illustrating a restrained state of a rear link according to the exemplary embodiment of the present invention.
Figure 3:
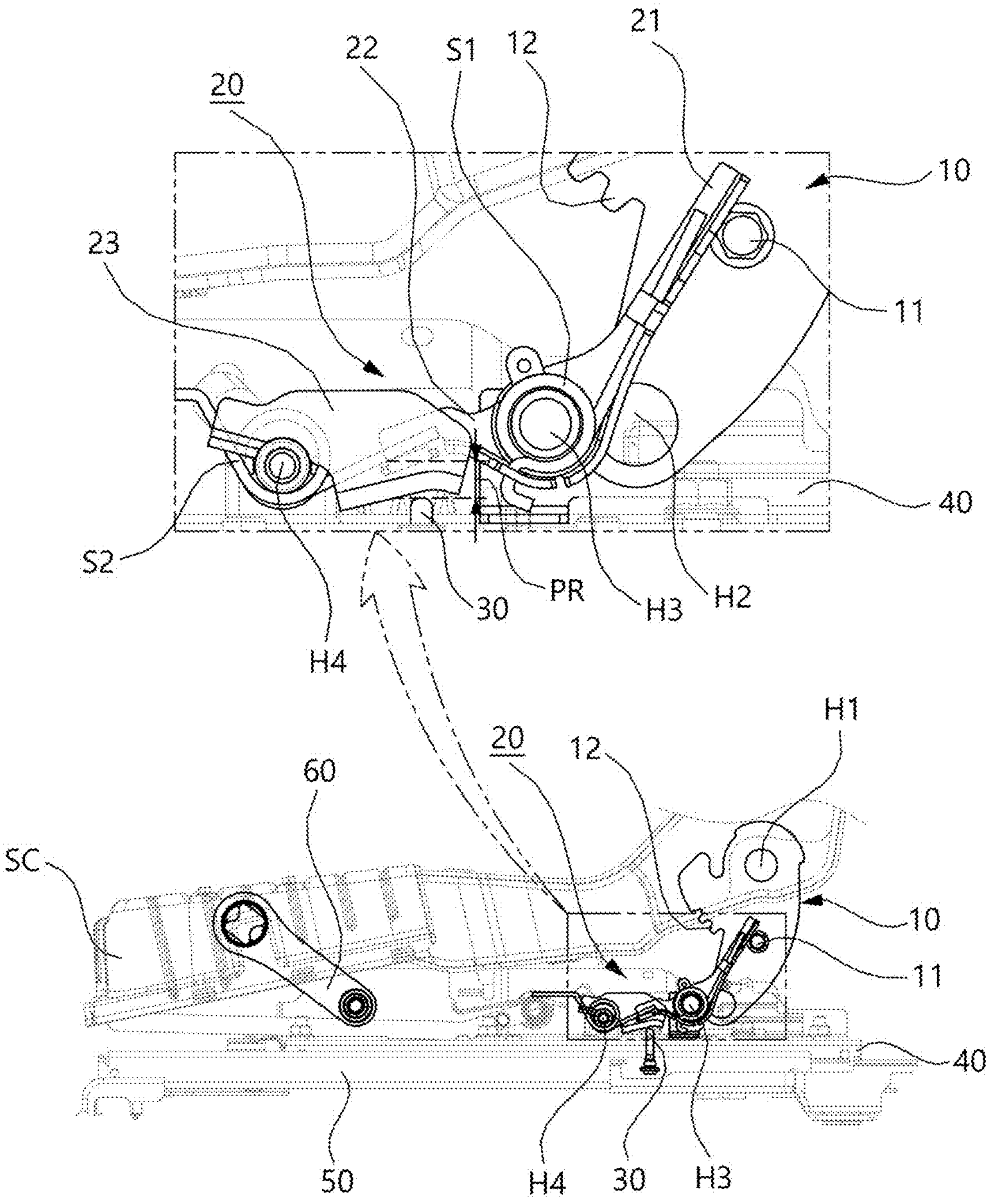
FIG. 3 is a view illustrating an operation of an unlocking device when the rear link according to the exemplary embodiment of the present invention is unrestrained.

FIG. 1 is a perspective view of a walk-in device for a vehicle seat according to an exemplary embodiment of the present invention, FIG. 2 is a view illustrating a restrained state of a rear link according to the exemplary embodiment of the present invention, and FIG. 3 is a view illustrating an operation of an unlocking device when the rear link according to the exemplary embodiment of the present invention is unrestrained.

As illustrated in FIGS. 1 to 3, the walk-in device for a vehicle seat of the present invention may include a rear link 10 configured to be restrained or unrestrained by an operation of a restraining device 70, an unlocking device 20 configured to operate in conjunction with the rear link 10, and a locking pin 30 configured to be pressed by an unlocking device 20.

One end of the rear link 10 may be connected to a seat cushion frame SC by a first hinge shaft H1. The other end of the rear link 10 may be connected to an upper rail 40 by a second hinge shaft H2.

The rear link 10 may be elastically supported by a rotation device 80 such as a spiral spring. When the rear link 10 is unrestrained, the rear link 10 may stand uprightly by being rotated in an unlocking direction about the second hinge shaft H2 by an elastic force of the rotation device 80.

The unlocking device 20 may press a locking pin 30 while operating in conjunction with a rotational operation of the rear link 10, such that a locked state of the upper rail 40 and a lower rail 50 locked by the locking pin 30 may be released.

The unlocking device 20 may be configured such that at least one bracket is elastically supported by an elastic member. The unlocking device 20 may include a first bracket 21, a second bracket 22, and a third bracket 23.

One end of the first bracket 21 may be rotated in an unlocking direction by being pressed by the rear link 10. The other end of the first bracket 21 may be elastically supported by a first elastic member S1 such as a torsion spring.

A pressing part 11 may be provided on the rear link 10. The pressing part 11 may protrude in a direction of the first bracket 21. One end of the first bracket 21 may be rotated in the unlocking direction by being pressed by the pressing part 11.

The first bracket 21 may be coupled to a third hinge shaft H3. The third hinge shaft H3 may be assembled to be supported by the upper rail 40. The first elastic member S1 may be coupled to the third hinge shaft H3.

One end of the second bracket 22 may be connected to the other end of the first bracket 21. The second bracket 22 may be coupled to the third hinge shaft H3. The second bracket 22 may rotate together with the first bracket 21 in the unlocking direction.

The third bracket 23 may be elastically supported by a second elastic member S2 such as a torsion spring. The third bracket 23 may press an upper end of the locking pin 30 while rotating in the unlocking direction by being pressed by the second bracket 22.

A semi-circular external contact groove 231 may be provided at one end of the third bracket 23. The external contact groove 231 may be assembled to be externally in contact with an outer-diameter portion of a fourth hinge shaft H4. The fourth hinge shaft H4 may be assembled to be supported by the upper rail 40. The second elastic member S2 may be coupled to the fourth hinge shaft H4.

The second bracket 22 may be connected to the upper rail 40 by a third elastic member S3.

A maximally pressed (PR) state of the locking pin 30 may be implemented when the third bracket 23 presses the locking pin 30 in the state in which the rear link 10 stands uprightly by the rotational operation. In the maximally pressed (PR) state of the locking pin 30, a locking plate 31 provided below the locking pin 30 may completely depart from a locking groove 51 of the lower rail 50.

A front link 60 may be provided at an interval from the rear link 10. One end of the front link 60 may be connected to the seat cushion frame SC. The other end of the front link 60 may be connected to the upper rail 40.

Figure 4:
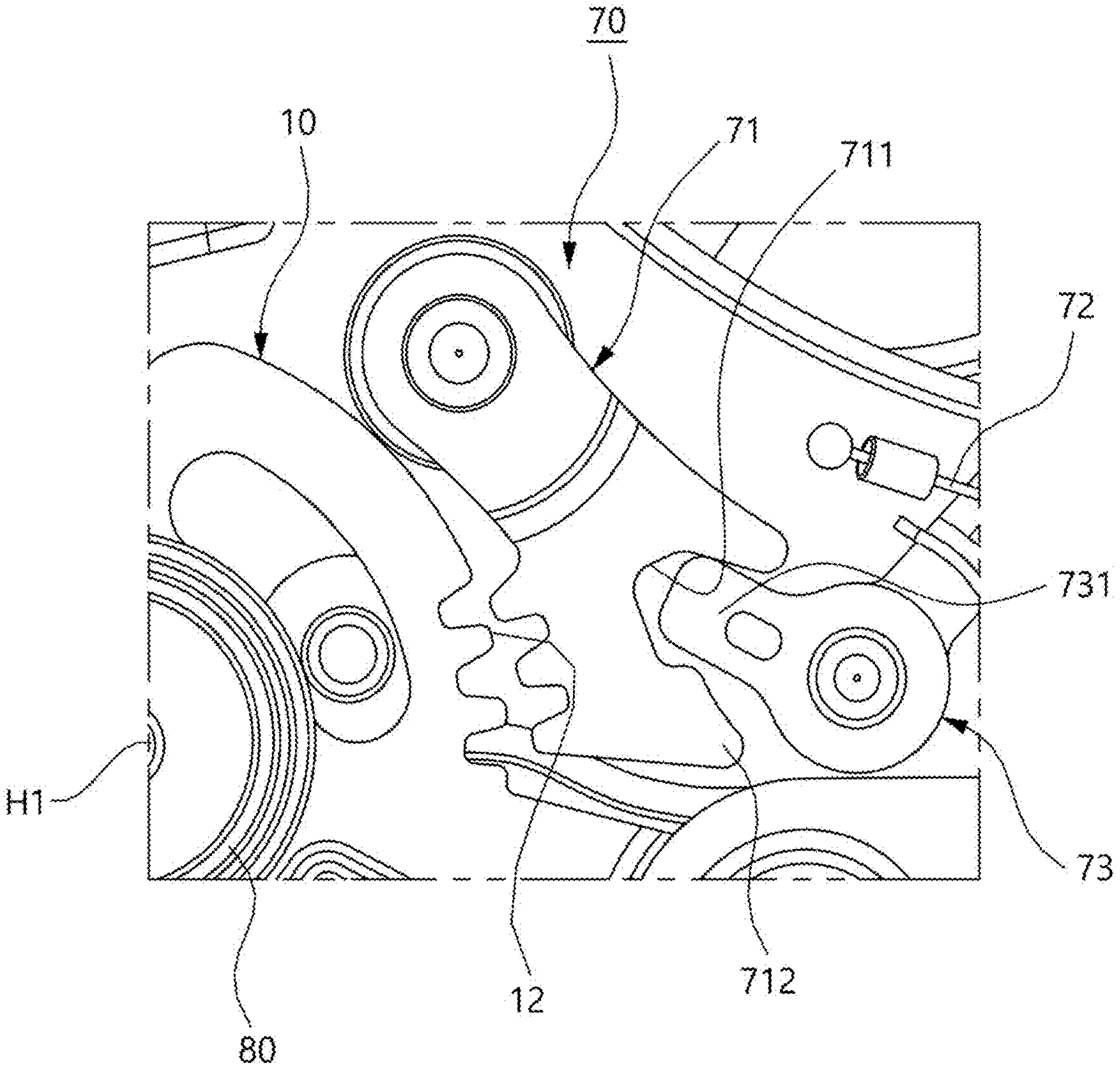
FIG. 4 is a view illustrating a restraining device according to the exemplary embodiment of the present invention.

FIG. 4 is a view illustrating the restraining device according to the exemplary embodiment of the present invention.

As illustrated in FIG. 4, the restraining device 70 may include a restraining gear 71 configured to engage with a gear portion 12 provided at one end of the rear link 10, and a locking lever 73 having a locking portion 731 configured to press the restraining gear 71, when the rear link 10 is restrained, and configured to be inserted into an unrestraining groove 711 of the restraining gear 71 when the rear link 10 is unrestrained.

The locking lever 73 may be connected to a cable 72. The cable 72 may be connected to a drive device (not illustrated) such as an actuator.

For example, when a passenger operates a walk-in switch (not illustrated), the cable 72 may be pulled by an operation of a drive device (not illustrated) such as an actuator, and the locking lever 73 connected to the cable 72 may rotate in an unrestraining direction.

Figure 5:
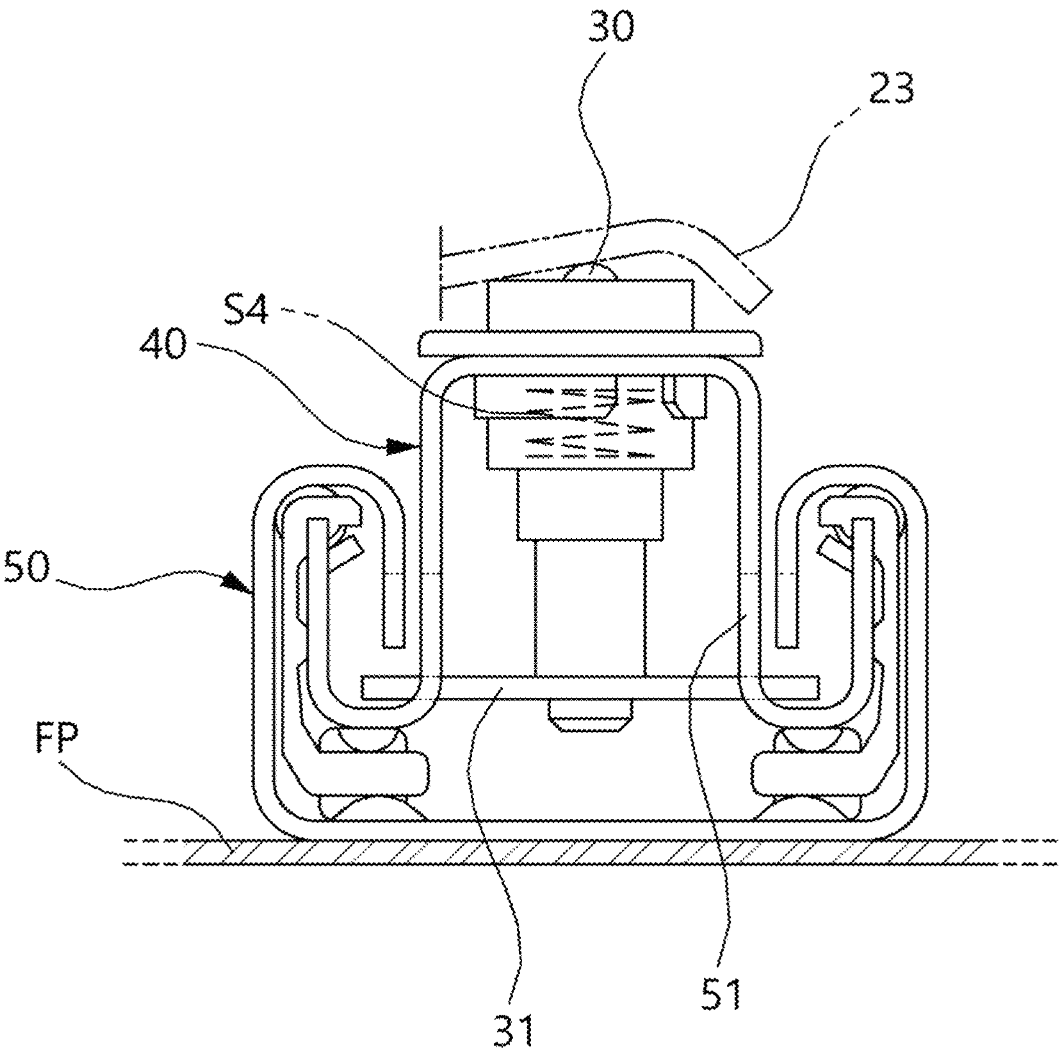
FIG. 5 is a view illustrating an unlocked state of a locking plate provided below a locking pin according to the exemplary embodiment of the present invention.

FIG. 5 is a view illustrating an unlocked state of the locking plate provided below the locking pin according to the exemplary embodiment of the present invention.

As illustrated in FIG. 5, an upper end of the locking pin 30 may penetrate an upper portion of the upper rail 40 and be exposed. An upper end of the locking pin 30 may be pressed downward by the third bracket 23.

When the locking pin 30 is pressed, the locking plate 31 provided below the locking pin 30 may depart from the locking groove 51 of the lower rail 50. Therefore, the locked state may be released.

A portion of the locking pin 30, which is positioned in the upper rail 40, may be elastically supported by a fourth elastic member S4.

The fourth elastic member S4 may be compressed by being pressed by the locking pin 30 when the locking pin 30 moves downward. When a pressing force of the third bracket 23, which presses the locking pin 30, is eliminated in the compressed state of the fourth elastic member S4, the fourth elastic member S4 may push the locking pin 30 upward while being stretched, thereby returning the locking pin 30 to an original position.

The lower rail 50 may be connected to a floor panel FP in the vehicle.

Next, an operation of the unlocking device when the rear link rotates will be specifically described.

As illustrated in FIGS. 1 to 3, when the passenger operates the walk-in switch (not illustrated), the rear link 10 may be unrestrained by an unrestraining operation of the restraining device 70. The unrestrained rear link 10 may rotate about the other end by the elastic force of the rotation device 80 such as a spiral spring.

As the rear link 10 rotates, the pressing part 11 of the rear link 10 may press the first bracket 21. The first bracket 21 may be rotated in the unlocking direction by the pressing part 11 of the rear link 10.

The first bracket 21 may press the first elastic member S1 while rotating in the unlocking direction. At the same time, the second bracket 22 connected to the first bracket 21 may press the third bracket 23 while rotating together with the first bracket 21 in the unlocking direction.

As the pressing force of the second bracket 22 is transmitted to the third bracket 23, the third bracket 23 may press the upper end of the locking pin 30. The locked state may be released as the locking pin 30 is pressed. The third bracket 23 may simultaneously press the second elastic member S2 while pressing the locking pin 30.

Next, an operation of the restraining device will be described specifically.

As illustrated in FIG. 4, the locking portion 731 of the locking lever 73 presses a restraining protrusion 712 of the restraining gear 71, such that the restraining gear 71 may engage with the gear portion 12 of the rear link 10. Therefore, the rear link 10 may be restrained.

The drive device (not illustrated), such as an actuator, may pull the cable 72 when the passenger operates the walk-in switch (not illustrated) in the state in which the restraining gear 71 engages with the gear portion 12 of the rear link 10.

As the cable 72 is pulled, the locking lever 73 connected to the cable 72 may rotate in the unlocking direction.

As the locking lever 73 rotates in an unrestraining direction, the locking portion 731 of the locking lever 73, which has pressed the restraining protrusion 712, may be inserted into the unrestraining groove 711 of the restraining gear 71.

When the locking portion 731, which has pressed the restraining gear 71, is inserted into the unrestraining groove 711 of the restraining gear 71, the restraining gear 71, which has engaged with the gear portion 12, may be disengaged.

As the restraining gear 71 and the gear portion 12 of the rear link 10 are disengaged, an unrestrained state may be implemented in which the rear link 10 may freely rotate.

Next, an operation of the locking pin will be specifically described.

As illustrated in FIG. 5, the third bracket 23 may press the upper end of the locking pin 30 as the unlocking device 20 operates in conjunction with the rotational operation of the rear link 10. Therefore, the locking pin 30 may move downward while pressing the fourth elastic member S4.

As the locking pin 30 moves downward, the locking plate 31, which is provided below the locking pin 30 inserted into the locking groove 51 of the lower rail 50, may depart from the locking groove 51, such that the completely unlocked state of the locking pin 30 may be implemented.

In the unlocked state, the upper rail 40 may freely move along the lower rail 50.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A walk-in device for a vehicle seat, the walk-in device comprising:

a rear link having one end connected to a seat cushion frame by a first hinge shaft, and another end connected to an upper rail by a second hinge shaft, the rear link being rotatable about the second hinge shaft in a first unlocking direction; and an unlocking device having at least one bracket that is configured to operate in conjunction with a rotational operation of the rear link, wherein the at least one bracket is configured to press a locking pin in a state in which the at least one bracket is elastically supported by an elastic member to implement an unlocked state, and wherein the at least one bracket of the unlocking device comprises:

a first bracket having one end rotatable in the first unlocking direction by being pressed by the rear link, and another end elastically supported by a first elastic member;

a second bracket having one end connected to the another end of the first bracket, the second bracket being rotatable in the first unlocking direction together with the first bracket; and a third bracket elastically supported by a second elastic member and configured to press the locking pin while rotating in a second unlocking direction by being pressed by the second bracket.

2. The walk-in device of claim 1, wherein a pressing part is disposed on the rear link, and the one end of the first bracket is configured to rotate in the first unlocking direction by being pressed by the pressing part.

3. The walk-in device of claim 1, wherein an upper end of the locking pin is configured to penetrate an upper portion of the upper rail and be exposed to the third bracket, and wherein when the upper end of the locking pin is pressed downward by the third bracket, a locking plate disposed below the locking pin is configured to depart from a locking groove of a lower rail to release a locked state.

4. The walk-in device of claim 3, wherein the locking plate is configured to completely depart from the locking groove of the lower rail when the third bracket, which is configured to operate in conjunction with the rear link when the rear link is in an upright position, maximally presses the locking pin.

5. The walk-in device of claim 1, wherein the first bracket and the first elastic member are coupled to a third hinge shaft connected to the upper rail.

6. The walk-in device of claim 4, wherein an external contact groove is defined at one end of the third bracket, the external contact groove is in contact with an outer-diameter portion of a fourth hinge shaft connected to the upper rail, and the second elastic member is coupled to the fourth hinge shaft.

7. A walk-in device for a vehicle seat, the walk-in device comprising:

a rear link having one end connected to a seat cushion frame by a first hinge shaft, and another end connected to an upper rail by a second hinge shaft, the rear link being rotatable about the second hinge shaft in a first unlocking direction; and an unlocking device having at least one bracket that is configured to operate in conjunction with a rotational operation of the rear link, wherein the at least one bracket is configured to press a locking pin in a state in which the at least one bracket is elastically supported by an elastic member to implement an unlocked state, wherein a gear portion is defined on an outer-diameter portion of the one end of the rear link, wherein the walk-in device further comprises a restraining device having a restraining gear, wherein the gear portion is configured to implement a restrained state of the rear link when the restraining gear of the restraining device engages with the gear portion, and wherein the gear portion and the restraining gear are configured to be disengaged when the restraining device performs a release operation, and the rear link is configured to rotate about the second hinge shaft in the first unlocking direction by a rotation device that elastically supports the rear link when the gear portion and the restraining gear are disengaged.

8. The walk-in device of claim 1, wherein a front link is disposed at an interval from the rear link, one end of the front link is connected to the seat cushion frame, and another end of the front link is connected to the upper rail.

9. The walk-in device of claim 1, wherein a portion of the locking pin, which is positioned in the upper rail, is elastically supported by a fourth elastic member, the fourth elastic member is configured to be compressed when the locking pin moves downward, and the fourth elastic member is configured to be stretched and return the locking pin to an original position when a pressing force of the third bracket is eliminated from the locking pin.

* * * * *